July 21, 1964   D. H. SCOTT   3,141,241
AERIAL NAVIGATION DEVICE
Filed July 21, 1960
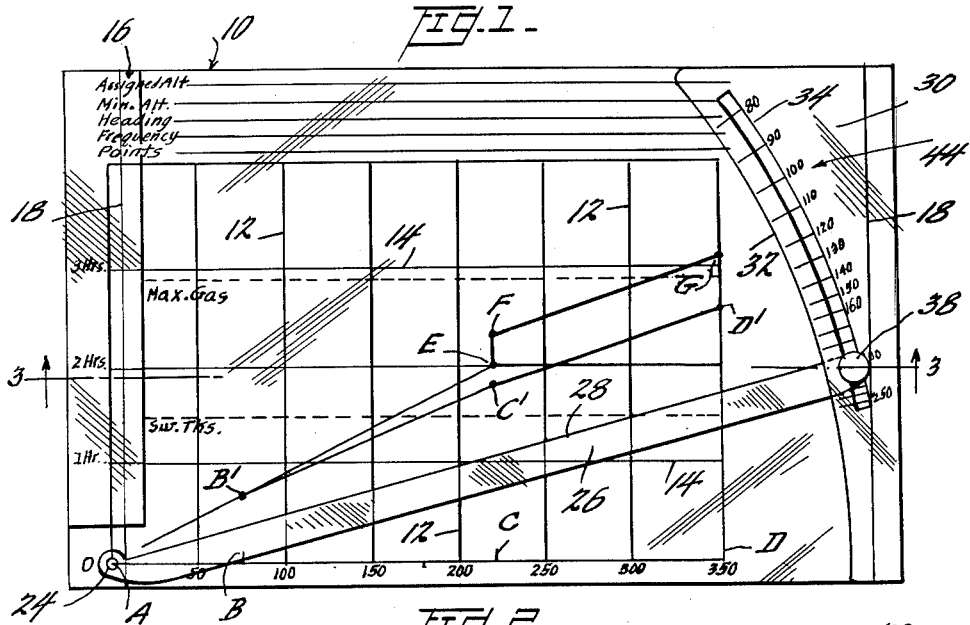
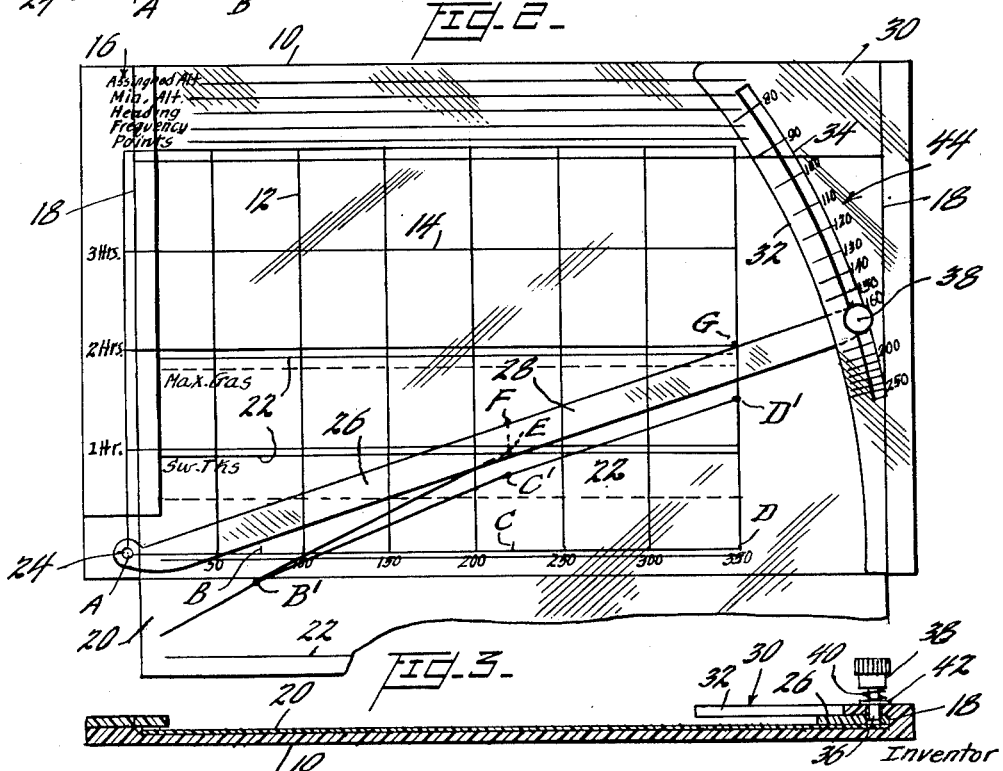
Inventor
David H. Scott
BY Parker and Walsh
ATTORNEYS

United States Patent Office

3,141,241
Patented July 21, 1964

3,141,241
AERIAL NAVIGATION DEVICE
David H. Scott, 3050 W. Lane Keys NW.,
Washington 7, D.C.
Filed July 21, 1960, Ser. No. 44,448
8 Claims. (Cl. 33—97)

The present invention relates generally to the art of navigation and is more particularly concerned with an improved aerial navigation device which partakes somewhat of the nature of a combined plotting board and computer.

In the navigation of an aircraft from one place to another over the surface of the earth, various methods are customarily employed depending upon the nature of the trip, the available equipment and aids to navigation, and the skill of the pilot or navigator. For example, in the case of local flights of relatively short duration or those conducted by pilots of relatively limited training, it is customary to resort to pilotage in which various compass headings are held and adjustments made thereto from time to time as the pilot passes over and identifies visually certain known check points along the route. In the case of trans-oceanic flights involving large aircraft, and where the complex problems of polar navigation are involved, other methods are customarily employed such as celestial navigation. However, apart from these exceptions, the vast majority of all aerial navigation is conducted by utilization of the various radio aids which are so placed as to practically cover the entire United States as well as other parts of the world.

In utilizing the various radio aids to navigation, and particularly where the very high frequency omni range radio stations are employed, the pilot is afforded a direct visual indication of his bearing to or from a particular station and, in some cases, depending upon the equipment available, the actual distance therefrom. Since the indication of the station bearing is visual, the pilot is able to compensate for wind effect simply by assuming a heading which will maintain the aircraft on a constant bearing to or from the station. Once the correct heading has thus been determined together with the exact time between two check points separated by a known distance, which latter is also made possible by the nature of the radio aids themselves, the ground speed may then be accurately determined and estimates computed as to the time of arrival over the next known check point, commonly referred to as the ETA.

In the United States, the number of licensed aircraft and the volume of air traffic have made it imperative that relatively strict rules be followed precisely in order to maintain proper separation between aircraft for the prevention of collision. These rules fall into two general categories known as Visual Flight Rules or VFR, and Instrument Flight Rules or IFR, depending upon whether the flight is to be conducted under circumstances such that the pilot has visual contact with the ground at all times or must navigate in clouds or other conditions during which control of the aircraft can be maintained solely by reference to instruments. In either case, it is desirable that the pilot either know or be able to quickly determine the exact position of the aircraft at any given time. Accordingly, while the navigation device in accordance with the present invention is particularly well adapted for use under IFR conditions, the invention is also highly useful in accomplishing cross-country flight under VFR conditions.

In the light of the foregoing, it is a principal object of the present invention to provide an aerial navigation device which affords a complete running visual portrayal of a cross-country flight from start to finish and which permits an instant visual comparison between the actual flight and the flight as planned ahead of time.

An important object of the invention is to provide a navigation device which enables the pilot to instantly determine his present position and future estimated times of arrival over subsequent check points simultaneously and without the use of a separate computer or slide rule type device.

Another object of the invention is to provide a navigation device which permits the pilot to quickly identify his maximum flight range and choice of available alternate airports and also provides means for quickly determining the proper time to switch from one fuel tank to another during a flight.

A further object of the invention is to provide a navigation device which furnishes all necessary data from which the actual wind direction and velocity encountered can be determined if required.

An additional object of the invention is to provide a navigation deviec which permits the easy plotting of delays caused by holding over given fixes or the like and also permits the instantaneous and simlutaneous determination of new estimated time of arrival over previously plotted fixes upon the expiration of holding.

Yet another object of the invention is to provide a navigation device which permits a flight to be plotted and easily erased to be used over again or in case a revised clearance is received during IFR flight which requires the determination of new check points or fixes.

It is also an object of the present invention to provide an aerial navigation device capable of accomplishing the foregoing objectives and yet which can also be relatively inexpensively constructed of a minimum number of working parts and which will provide extended trouble free service life in use.

The foregoing together with other and further objects and advantages of the invention will become more readily apparent to those skilled in the art from a consideration of the following detailed specification taken in conjunction with the accompanying figures of the drawing in which:

FIGURE 1 is a top plan view of a preferred embodiment of the navigation device in accordance with the present invention;

FIGURE 2 is a top plan view of the device illustrated in FIGURE 1 but showing the parts in a different position of adjustment; and FIGURE 3 is a transverse cross-sectional view through the device taken substantially along the line 3—3 of FIGURE 1.

Referring now in somewhat greater detail to the individual figures of the drawing, the preferred embodiment of the invention selected for the purpose of illustration herein is seen to comprise a generally rectangular flat base 10 which may be made of some relatively hard material such as plastic, wood, or metal. One the top surface of the base 10 there is provided a visible grid consisting of evenly spaced vertical lines 12 and another group of evenly spaced horizontal lines 14. The groups of vertical and horizontal lines 12 and 14 forming the grid may be provided on the top surface of the base 10 in any convenient manner as by engraving or printing them upon the plastic or other top surface of the latter. In any event, the vertical lines 12 represent equal increments of distance increasing from left to right and the horizontal lines 14 similarly represent equal increments of time increasing from the bottom or zero line toward the top. For the sake of simplicity and ease of illustration, the vertical lines 12 are indicated as representing fifty mile increments while the horizontal lines 14 represent one hour increments of time. However, it is to be understood that these major subdivisions are preferably further subdivided by means of relatively lighter lines representing increments of five miles each in the horizontal sense and time increments of five minutes each in the vertical sense. The end result is, in any case, a graph in which distance may plotted against time and the distance may be considered to be in either nautical or statute miles depending upon whether the ground speed, determined in a manner to be hereinafter more fully described, is desired to be in knots or miles per hour.

Adjacent the upper left hand corner of the base 10, there is also provided certain additional indicia affording various line headings so that various navigational data may be recorded on that portion of the device which generally serves no other useful purpose in navigation. For example, this marking designated generally by reference numeral 16 may be employed to designate the appropriate lines for recording such items as assigned altitude, minimum altitude, heading, radio frequency, and the identification of the various check points. It will also be understood that similar indicia could be provided adjacent the lower edge of the device, if desired.

As perhaps best illustrated in FIGURE 3, the base 10 is provided along its top side edges with a pair of inwardly open channels 18 within which is slidably mounted a generally flat rectangular overlay 20 which is preferably formed of a transparent plastic material which may be written on with a pencil and erased. While the overlay is preferably formed of a transparent plastic material having spaced horizontal lines of a color which contrasts with the color of the horizontal grid lines on the base 10, it will be understood that the overlay 20 need not be transparent and, in the latter case, the entire grid consisting of the vertical lines 12 and horizontal lines 14 will be suitably engraved or otherwise placed upon the upper surface of the overlay 20. In any event, the overlay 20 is slidably received within the channels 18 in such manner that it is guided by the latter for vertical movement across the top surface of the base 10. In the preferred embodiment, the overlay 20 is transparent and the horizontal lines of contrasting color are designated by reference numeral 22 and it will be understood that the spaced horizontal lines 22 correspond to time increments equal to the time increments represented by the horizontal lines 14 on the base 10.

Adjacent the lower left corner of the base 10 there is pivotally mounted as by means of a grommet 24, a movable arm 26. The grommet 24 constituting the pivotal mounting for the movable arm 26 is located at the intersection of the zero lines of the vertical distance lines 12 and horizontal time lines 14 and is thus located at the point of origin of the grid. It will also be particularly noted that the movable arm 26 is provided with an index line in the form of a straight edge 28 which is aligned with the point of origin of the grid or extends through the center of the grommet 24.

Along the right hand edge of the base 10, the upper rib or flange 30 of the right hand channel 18 varies in width from top to bottom of the base 10 and is provided with a curved inner periphery 32 and with a curved through slot 34 adjacent the latter. The curved through slot 34 is formed as a radial arc about the point of origin of the grid or, in the preferred form of the device, on a radius about the grommet 24. A stud bolt 36 extends upwardly from the right end of the arm 26 through the curved slot 34 and a yieldable fastener in the form of a knurled cap nut 38 is threaded upon the stud bolt 36 above the slot 34 and, through the interposition of a small coil spring 40 and washer 42 serves to adjustably and resiliently or yieldingly retain the arm 26 in various radial positions of adjustment about the grommet or grid origin 24.

As shown in FIGURES 1 and 2, the upper right hand portion of the base 10 which lies beneath the rib or flange 30 is provided with further visible indicia which, in the preferred form of the device, is calibrated in terms of velocity and is employed as representing ground speed. As shown in the drawings, the rib or flange 30 is made of transparent plastic so that the indicia at the upper right hand corner of the base representing velocity will be clearly visible therethrough. However, it will be apparent that the indicia representing velocity could just as easily be engraved or otherwise placed upon the top surface of the rib 30 so long as it is possible to visually determine the position of the index line or straight edge 28 with reference thereto. Since the grid is nothing more than a graphical representation of distance plotted against time, it will be apparent that a line drawn between any two correctly plotted points on the grid, as by means of the straight edge 28, will serve to correlate the time-distance relationship between such two points and will therefore constitute a visual indication of velocity or ground speed. Thus, for any given values of time and distance appearing on the grid lines, the indicia at the upper right hand corner of the device as designated by reference numeral 44 may be calibrated in terms of velocity or ground speed and, in cooperation with the straight edge or index line 28, will serve to indicate the ground speed between any two points on the grid with which the straight edge 28 is aligned.

*Operation*

Although it is believed that the operation of the device will be largely apparent to those skilled in the art from the foregoing description, a brief explanation of the use of the device in a typical IFR flight may be helpful. Referring to FIGURE 1, wherein the arm 26 has been moved downwardly so that the plotting may be more redily seen, the first step to be taken is to plot the points B, C and D along the base of the overlay 20. In the example shown, it is assumed that point A is the airport or radio station at the point of origin of the flight, the point B is a check point 75 miles distant, the point C a check point 225 miles distant and point the D is the airport of destination located 350 miles from A. This information is readily secured from any available aviation or radio facility chart and the points B, C and D located along the base line to the right from the point A. After this has been done, the arm 26 is moved upwardly, pivotally about the grommet 24, until the index line or straight edge 28 is aligned with the 100 knot mark on the upper right hand scale 44. The figure of 100 knots is assumed as the initial ground speed of the aircraft which is at a reduced value in view of the lower speed customarily used in climbing to cruising altitude.

With the straight edge 28 aligned with the 100 knot mark on the scale and with the transparent overlay 20 properly positioned over the base 10, which is easily accomplished since the overlay 20 and base 10 are identical in height and their base lines may be easily registered without overlap, a line is drawn from A to B′, the latter point being located directly over the point B previously marked at the base of the device. At the point B′, it is assumed that the selected cruising altitude has been reached and the next portion of the flight from B′ to C′ will be made at normal cruising speed of 140 knots. The straight edge 28 is accordingly aligned with the 140 knot mark on the scale and the overlay 20 adjusted vertically until the point B′ is again aligned with the straight edge 28. A line is then drawn from the point B′ to the point C′, the latter being located directly above the previously plotted point C. The line C′–D′ is similarly located although, in this instance, a ground speed of 160 knots is assumed due to an increased speed of let-down and a more favorable wind due to a change in course.

The lines A–B′, B′–C′, and C′–D′ are preferably drawn in a contrasting color such as red and constitute a visual representation of the flight as plotted in advance. It will be noted that the time between any two check points may be readily determined by measuring the distance between them on the vertical scale at the left hand side of the device. It will also be apparent that, as shown by the two dotted lines, the pilot is given a visual indication of the correct time to switch from one fuel tank to another and also the maximum fuel available which may be used to determine a choice of alternate airports.

As soon as the pilot receives his flight clearance, the actual time of departure from the airport of origin is noted and, preferably, written upon the overlay 20 adjacent the point A. At this time the spaced horizontal lines 14 lying above the horizontal line of origin may also be marked to indicate the clock time running from the time of departure. For example, if the actual time of departure is 10:36, the next line above may be marked 11:36, the next line 12:36, and so on. Of course, where the actual times are thus written directly upon the overlay 20, the estimated time of arrival over any subsequent check point may be read directly from the overlay at the left hand margin. Of course, where this is not done, the overlay 20 must be centered over the base 10 without any overlap before the estimated time of arrival over any subsequent check point can be accurately determined from the left hand time scale. The time thus determined is then added to the actual time of departure to determine the new estimated time of arrival.

In the example given, it is assumed that the pilot actually makes good a ground speed of 100 knots between the airport of departure A and the first check point B'. A black line may then be drawn upon the overlay 20 between these two points and, since the actual ground speed made good agrees with the estimated ground speed as plotted prior to flight, the black line between the points A and B' will exactly coincide with the previously drawn red line between these two points. At the check point B', therefore, the pilot, by simply noting his actual time over the check point B', can instantly determine that the flight is proceeding exactly as planned.

Continuing the flight in accordance with the assumed example, the pilot next notes his actual time over the point C or C' and places a dot upon the overlay 20 at the proper position. In the example shown, the actual time of arrival over the point C or C' is assumed to be two hours subsequent to the time of departure and the dot is therefore placed at the point E. A black line may then be drawn between the points B' and E, from which the pilot can immediately and visually determine that his flight is falling slightly behind schedule. The actual ground speed between the points B' and E can be readily determined, if desired, simply by adjusting the positions of the arm 26 and the overlay 20 so that the straight edge 28 is aligned with both points B' and E. The actual ground speed made good between these two points may then be read from the scale 44 at the right hand side of the device. In addition, if no further changes in the flight plan are contemplated, the estimated times of arrival over any future check points may be instantly determined by placing dots at the appropriate points along the new ground speed line and reading the times at the corresponding position along the left hand edge of the device. Again, the overlay 20 must be centered over the base 10 to determine these new estimated times of arrival unless steps have already been taken to record actual clock times on the face of the overlay itself as previously mentioned.

It is next assumed that, upon reaching the check point E, the pilot is required to hold over this point for fifteen minutes. This is quite simply plotted upon the overlay by extending the line E—F in a vertical direction for a distance equal to fifteen minutes on the left hand time scale. Further assuming the pilot to be cleared to proceed to his destination after holding for fifteen minutes over point E, the line F-G may then be drawn on the overlay by setting the movable arm 26 in a position to correspond either to the originally planned ground speed of 160 knots or, if better planning so dictates, the arm 26 may be set to the actual ground speed as determined by the line B'-E. In any event the line F-G represents the new ground speed to the point of destination and, once again, the new estimated time of arrival over the point D can be instantly determined from the time scale at the left in the manner previously described. In the example illustrated, the ground speed line F-G represents the same ground speed as the line C'-D'.

It will be particularly noted that, at any time during the progress of a flight between any two check points, the estimated position of the aircraft can be immediately determined simply by glancing at the clock and locating a point on the proper ground speed line beneath which the distance from any other point can be seen at a glance on the horizontal distance scale. This information is of particular value in the conduct of flights under IFR procedures since the position of an aircraft at all times must be kept track of and reported on request.

It will be apparent that the device as described actually provides a graphic presentation of the simple equation that velocity or speed is equal to distance divided by time. However, by providing a movable index line or straight edge in cooperation with a vertically slidable grid, the speed between any two check points a known distance apart can be quickly determined simply by aligning the straight edge with the two points. Once this has been determined, the estimated time of arrival over any succeeding check point for which the same ground speed applies can be instantly determined by locating the point on the speed line above the actual distance along the base scale and reading the elapsed time on the vertical scale at the left hand side of the device. It will also be apparent that even a brief visual inspection of the face of the overlay at any time will clearly show the pilot whether his flight is running ahead or behind schedule by a comparison between the lines as originally plotted and the lines drawn in as the flight progresses. The manner in which the overlay 20 and movable arm 26 may be moved relative to one another in order to align two points on the overlay is illustrated in FIGURE 2 in which the parts are positioned for drawing the line F-G. It will be noted, however, that, so long as the arm 26 remains fixed in position, the same speed will be represented by any line drawn on the overlay regardless of the position of the latter relative to the base.

As previously mentioned, the device also affords a convenient means of determining wind direction and velocity where this information is desired as, for example, in computing headings for other courses or for checking weather data given in advance of the flight. Since the actual ground speed can be read directly from a speed line drawn on the overlay, and since the heading, track and true air speed are already known to the pilot, the actual wind direction and velocity can be readily calculated by the use of any standard computer.

For flights involving longer distances than can be conveniently shown on a single overlay, two or more different overlays may be used and simply substituted for one another as the flight progresses. Furthermore, while the example illustrated is calibrated in terms of relatively low ground speeds, the device can be adapted without change in principle to any other desired speed range.

While I have selected a preferred embodiment of the invention for the purpose of illustration and description, it will be obvious that numerous modifications, substitutions of materials and other changes will occur to those skilled in the art without departing from the spirit or scope of the invention as defined in the following claims.

I claim:

1. An aerial navigation device comprising a generally rectangular flat base having visible indicia on the top surface thereof in the form of a grid of evenly spaced vertical and horizontal lines, said vertical lines representing equal increments of distance increasing from left to right and said horizontal lines representing equal increments of time increasing from bottom to top, additional indicia on said base above said grid providing space for recording navigational data, means forming inwardly open channels along the top side edges of said base, a generally flat rectangular overlay of transparent plastic material slidably received in said channels for vertical movement over the top surface of said base, spaced horizontal lines on said overlay of a contrasting color to that of said horizontal grid lines and corresponding to equal time increments thereof, a movable arm pivotally mounted at the lower left corner of said base at the point of origin of said grid and having a straight edge alinged with said point of origin said movable arm being free of any operative indicia cooperating in the solution of navigational problems, said channel forming means at the right edge of said base varying in width and having a curved through slot adjacent its inner periphery formed as a radial arc about the point of origin of said grid, a stud bolt extending upwardly from said arm through said slot, a yieldable fastener attached to said bolt above said slot for adjustably retaining said arm in various radial positions about said grid origin, and further indicia on said base adjacent said slot cooperating with said straight edge and calibrated in terms of velocity.

2. An aerial navigation device comprising a generally rectangular flat base having visible indicia on the top surface thereof in the form of a grid of evenly spaced vertical and horizontal lines, said vertical lines representing equal increments of distance increasing from left to right and said horizontal lines representing equal increments of time increasing from bottom to top, means forming inwardly open channels along the top side edges of said base, a generally flat rectangular overlay of transparent plastic material slidably received in said channels for vertical movement over the top surface of said base, spaced horizontal lines on said overlay of a contrasting color to that of said horizontal grid lines and corresponding to equal time increments thereof, a movable arm pivotally mounted at the lower left corner of said base at the point of origin of said grid and having a straight edge aligned with said point of origin said movable arm being free of any operative indicia cooperating in the solution of navigational problems, said channel forming means at the right edge of said base varying in width and having a curved through slot adjacent its inner periphery formed as a radial arc about the point of origin of said grid, a stud bolt extending upwardly from said arm through said slot, a yieldable fastener attached to said bolt above said slot for adjustably retaining said arm in various radial positions about said grid origin, and further indicia on said base adjacent said slot cooperating with said straight edge and calibrated in terms of velocity.

3. An aerial navigation device comprising a generally rectangular flat base having visible indicia on the top surface thereof in the form of a grid of evenly spaced vertical and horizontal lines, said vertical lines representing equal increments of distance increasing from left to right and said horizontal lines representing equal increments of time increasing from bottom to top, means forming inwardly open channels along the top side edges of said base, a generally flat rectangular overlay slidably received in said channels for vertical movement over the top surface of said base, spaced horizontal lines on said overlay corresponding to equal time increments of said grid, a movable arm pivotally mounted at the lower left corner of said base at the point of origin of said grid and having a straight edge aligned with said point of origin said movable arm being free of any operative indicia cooperating in the solution of navigational problems, said channel forming means at the right edge of said base varying in width and having a curved through slot adjacent its inner periphery formed as a radial arc about the point of origin of said grid, a stud bolt extending upwardly from said arm through said slot, a yieldable fastener attached to said bolt above said slot for adjustably retaining said arm in various radial positions about said grid origin, and further indicia on said base adjacent said slot cooperating with said straight edge and calibrated in terms of velocity.

4. An aerial navigation device comprising a base having visible indicia on the top surface thereof in the form of a grid of spaced vertical and horizontal lines, said vertical lines representing increments of distance increasing from left to right and said horizontal lines representing increments of time increasing from bottom to top, means forming inwardly open channels along the top side edges of said base, a transparent overlay slidably received in said channels for vertical movement over the top surface of said base, spaced horizontal lines on said overlay corresponding to time increments of said grid, a movable arm pivotally mounted at the lower left corner of said base at the point of origin of said grid and having a straight edge aligned with said point of origin said movable arm being free of any operative indicia cooperating in the solution of navigational problems, said channel forming means at the right edge of said base varying in width and having a curved through slot adjacent its inner periphery formed as a radial arc about the point of origin of said grid, a stud bolt extending upwardly from said arm through said slot, a yieldable fastener attached to said bolt above said slot for adjustably retaining said arm in various radial positions about said grid origin, and further indicia on said base adjacent said slot cooperating with said straight edge and calibrated in terms of velocity.

5. An aerial navigation device comprising a base having visible indicia on the top surface thereof in the form of a grid of spaced vertical and horizontal lines, said vertical lines representing increments of distance increasing from left to right and said horizontal lines representing increments of time increasing from bottom to top, means forming inwardly open channels along the top side edges of said base, a transparent overlay slidably received in said channels for vertical movement over the top surface of said base, spaced horizontal lines on said overlay corresponding to time increments of said grid, a transparent movable arm pivotally mounted at the lower left corner of said base at the point of origin of said grid and having a straight edge aligned with said point of origin said movable arm being free of any operative indicia cooperating in the solution of navigational problems, adjustable means having mechanical connection with said base and said arm for resiliently retaining the latter in various radial positions relative to said base, and further indicia on said base cooperating with said straight edge and calibrated in terms of velocity.

6. An aerial navigation device comprising a base having visible indicia on the top surface thereof in the form of a grid of spaced vertical and horizontal lines, said vertical lines representing increments of distance increasing from left to right and said horizontal lines representing increments of time increasing from bottom to top, means forming inwardly open channels along the top side edges of said base, a transparent overlay slidably received in said channels for vertical movement over the top surface of said base, means on said overlay for selectively aligning the overlay in predetermined vertical positions with respect to said base, a movable arm pivotally mounted at the lower left corner of said base at the point of origin of said grid and having a straight edge aligned with said point of origin said movable arm being free of any operative indicia cooperating in the solution of navigational problems, adjustable means having mechanical connection with said base and said arm for resiliently retaining the latter in various radial positions relative to said base, and further indicia on said base cooperating with said straight edge and calibrated in terms of velocity.

7. A navigation device comprising a base having visible indicia on the top surface thereof in the form of a grid of spaced vertical and horizontal lines, said vertical lines representing increments of distance increasing from left to right and said horizontal lines representing increments of time increasing from bottom to top, a transparent overlay, means slidably mounting said overlay for vertical movement over the top surface of said base, means on said overlay for selectively aligning the overlay in predetermined vertical positions with respect to said base, a movable arm pivotally mounted at the lower left corner of said base at the point of origin of said grid and having a straight edge aligned with said point of origin said movable arm being free of any operative indicia cooperating in the solution of navigational problems, adjustable means having mechanical connection with said base and said arm for resiliently retaining the latter in various radial positions relative to said base, and further indicia on said base cooperating with said straight edge and calibrated in terms of velocity.

8. A navigation device comprising a base having visible indicia on the top surface thereof in the form of a grid of spaced vertical and horizontal lines, said vertical lines representing increments of distance and said horizontal lines representing increments of time, a transparent overlay, means slidably mounting said overlay for vertical movement over the top surface of said base, means on said overlay for selectively aligning the overlay in predetermined vertical positions with respect to said base, a movable arm pivotally mounted on said base at the point of origin of said grid and having a straight edge aligned with said point of origin said movable arm being free of any operative indicia cooperating in the solution of navigational problems, adjustable means for resiliently retaining said arm in various radial positions relative to said base, and further indicia on said base cooperating with said straight edge and calibrated in terms of velocity.

References Cited in the file of this patent

UNITED STATES PATENTS

| | | |
|---|---|---|
| 383,242 | Palmer | May 22, 1888 |
| 732,985 | Wilson et al. | July 7, 1903 |
| 1,074,439 | Kincaid | Sept. 30, 1913 |
| 1,367,612 | McKinney | Feb. 8, 1921 |
| 1,937,831 | McCollum | Dec. 5, 1933 |
| 2,520,904 | Boehm | Sept. 5, 1950 |

FOREIGN PATENTS

| | | |
|---|---|---|
| 155,379 | Great Britain | Dec. 20, 1920 |
| 187,411 | Great Britain | Oct. 26, 1922 |